United States Patent [19]
Casey

[11] 3,741,008
[45] June 26, 1973

[54] CARBURETOR FLOW STAND

[75] Inventor: Edward H. Casey, Creve Coeur, Mo.

[73] Assignee: ACF Industries, Incorporated, New York, N.Y.

[22] Filed: July 1, 1971

[21] Appl. No.: 158,801

[52] U.S. Cl. .................................. 73/118, 73/196
[51] Int. Cl. ........................................ G01m 15/00
[58] Field of Search ..................... 73/118, 3, 194 R, 73/194 E, 194 EM, 196; 250/43.5 FC, 71 T, 106 T; 356/181

[56] References Cited
UNITED STATES PATENTS

| | | | |
|---|---|---|---|
| 3,080,876 | 3/1963 | Adamson | 73/196 X |
| 3,329,411 | 7/1967 | Offner | 73/196 X |
| 3,469,442 | 9/1969 | Brueckner | 73/118 |
| 3,455,143 | 7/1969 | Shamp | 73/3 |
| 2,826,700 | 3/1958 | Hull | 250/43.5 FC |
| 3,528,080 | 9/1970 | Greene et al. | 73/118 |
| 3,554,004 | 1/1971 | Rauch et al. | 73/32 A |
| 3,373,600 | 3/1968 | Taplin | 73/32 A |
| 2,943,045 | 6/1960 | Hull et al. | 240/43.5 FC |

Primary Examiner—Jerry W. Myracle
Attorney—Irwin M. Lewis

[57] ABSTRACT

A carburetor flow stand in which air is drawn through the carburetor by a vacuum pump. This causes fuel to flow and measurement of the fuel as well as measurement of the air/fuel ratio is accomplished by sensing and measuring at a point below the throttle valve, the respective quantities of air and fuel passing through the carburetor. In one embodiment the property of the fuel which is measured is a tracer contained in the fuel. In another embodiment the property measured is the absolute density of the vaporized air/fuel mixture.

20 Claims, 3 Drawing Figures

CARBURETOR FLOW STAND

BACKGROUND OF THE INVENTION

In the manufacture of carburetors it is an industry-wide practice to place each so-manufactured carburetor on a flow stand to quantitatively determine the amount of air and fuel being handled by the carburetor for a number of different settings of the throttle valve. Heretofore the quantity of air has been measured after the air leaves the carburetor and after the fuel has been removed from the air. The air measurement determinations have been by various schemes including orifice meters, venturi meters, and sonic nozzles. In combination with any of the aforementioned air measurement schemes, the fuel has been measured at the point it enters the carburetor bowl. Again various kinds of meters have been used, some employing simple U-tubes, others employing positive displacement meters.

With increasing demands upon the accuracy of fuel metering in the carburetor to cope with clean air requirements, more and more sophistication has gone into the fuel measurement. This has usually required an interface with some sort of a servo mechanism so that a simple meter readout can be obtained for the fuel flow. The increasing complexity has resulted in very great decrease in the rapidity with which the fuel measurement can be made. In the aforementioned types of flow stands it is notable that the air measurement is achieved very rapidly and this air measurement is determined at a point after the air leaves the carburetor. It is also notable that fuel measurement is very slow because a positive displacement meter measures the fuel as it enters the carburetor.

It is an object of the invention to achieve more rapid measurement of fuel flow. It is a further object of the invention to obtain the fuel flow measurement after the fuel-air mixture leaves the carburetor in a manner similar to measurement of air. It is still another object of the invention to measure the fuel flow indirectly by utilizing a tracer in the fuel.

It is still another object of the invention to obtain fuel flow and/or fuel-air ratios by utilizing one or more of the physical properties of the fuel and/or the air-fuel mixture.

A present day carburetor flow stand of considerable complexity and sophistication is described in detail in the U.S. Pat. No. 3,517,552 to Converse, et al. dated June 30, 1970 and entitled "Apparatus for Testing Carburetors."

BRIEF DESCRIPTION OF THE INVENTION

According to the invention air/fuel ratio measurement is achieved by making all measurements below the throttle valve. In some instances it may be possible to make a single direct measurement which is, in fact, air/fuel ratio. In the embodiments shown, provision is made for separate measurements of air and fuel with further provision for combining these two measurements to result in an air/fuel ratio readout.

In one embodiment a tracer material is put into the fuel and a sensor located below the throttle valve determines the amount of tracer in the air/fuel mixture and thus indirectly measures the quantity of fuel present.

In another embodiment the sensor senses a physical property of the air/fuel mixture such as the density thereof and from this sensing delivers a signal which can be representative of the air/fuel ratio or representative of the quantity of fuel in the mixture.

Chosen for illustrative purposes only is a capacitance probe sensor which counts the number of particles of a material such as metal filings which pass the probe in a given time interval. It is, of course, necessary with such an embodiment to previously mix a known quantity of particles into the fuel supply. Other sensors of the tracer type might include, or can include, sensors able to pick up information from fluorescent particles, phosphorescent particles and other phenomenon of like material or even tracers that have properties detectable by infra-red or ultraviolet analysis.

Any one of several physical phenomenon might be measured but in the embodiment shown the density of the fluid mixture is sensed. The particular embodiment utilizes a fluidic oscillator wherein known variables such as temperature and pressure are held constant and the frequency of the oscillator is dependent upon the density of the fuel-air mixture passing through the oscillator. A comparison oscillator for air only can be utilized in order to develop a beat frequency output which is representative of the increase in density of the mixture over the density of air.

DETAILED DESCRIPTION

Figure 1:
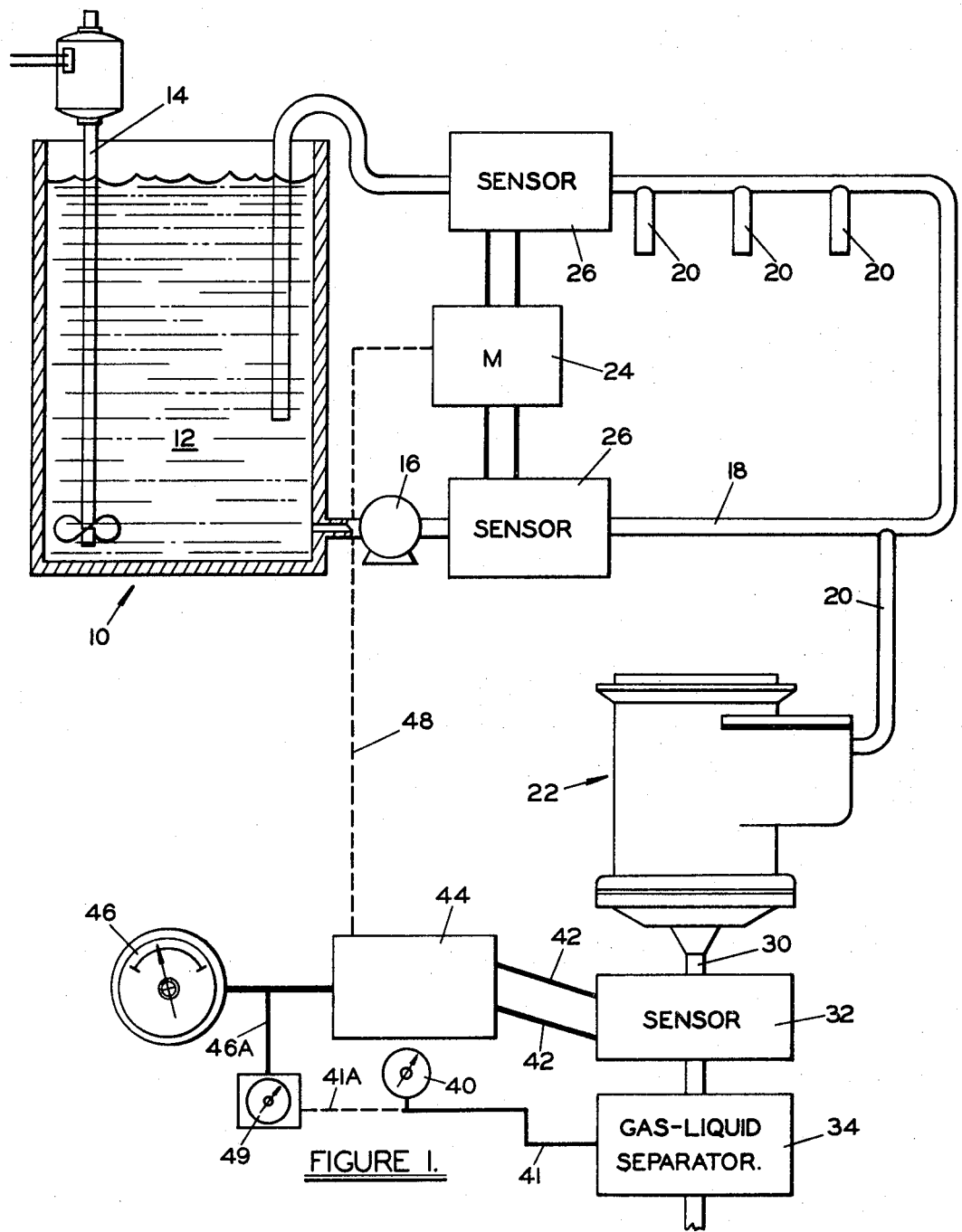
FIG. 1 is a schematic of one embodiment of a carburetor flow stand of the invention.

In FIG. 1 there is shown a "fuel tank" 10 containing a body of liquid fuel 12. Fuel 12 contains a tracer, to be described later, which can be maintained in a uniform dispersion within the tank by way of stirrer 14. Fuel is withdrawn from tank 10 by way of pump 16 which discharges into pipe loop 18. Pipe loop 18 has a plurality of drops 20 which deliver fuel, including a tracer material, to a number of carburetors, one of which is shown at 22. Carburetor 22 is shown in outline form only but it is to be understood that it contains the usual fuel bowl and float mechanism together with an automatic choke, idle and high speed fuel systems, as well as a conventional throttle valve.

In conjunction with recirculating pipe loop 18, there is installed a monitor 24 which can be connected to one or both of sensors 26 installed in the loop 18. As will be described later, sensors 26 detect the quantity of tracer in the fluids passing through pipe 18 and by way of the electronics in monitor 24 give a reading by way of suitable meters to let an operator know at any time what the concentration of the tracer is. Although not shown, the monitor, through electronics or other controls, can be used to regulate the input of fuel and/or tracer into the tank 10 so that the concentration of tracer in the fuel can be maintained at the required level. The fuel in tank 10 can be gasoline such as is used in the automobile on which the carburetor will be installed. In practice, however, it has been found that gasoline is an unsatisfactory fuel for this purpose because of its high flammability and inherent safety dangers. As a practical matter, fuel in the tank is usually a less volatile material, such as Stoddard's solvent, having a flash point above 100° Farenheit, thereby reducing the hazards of operation.

Figure 3:
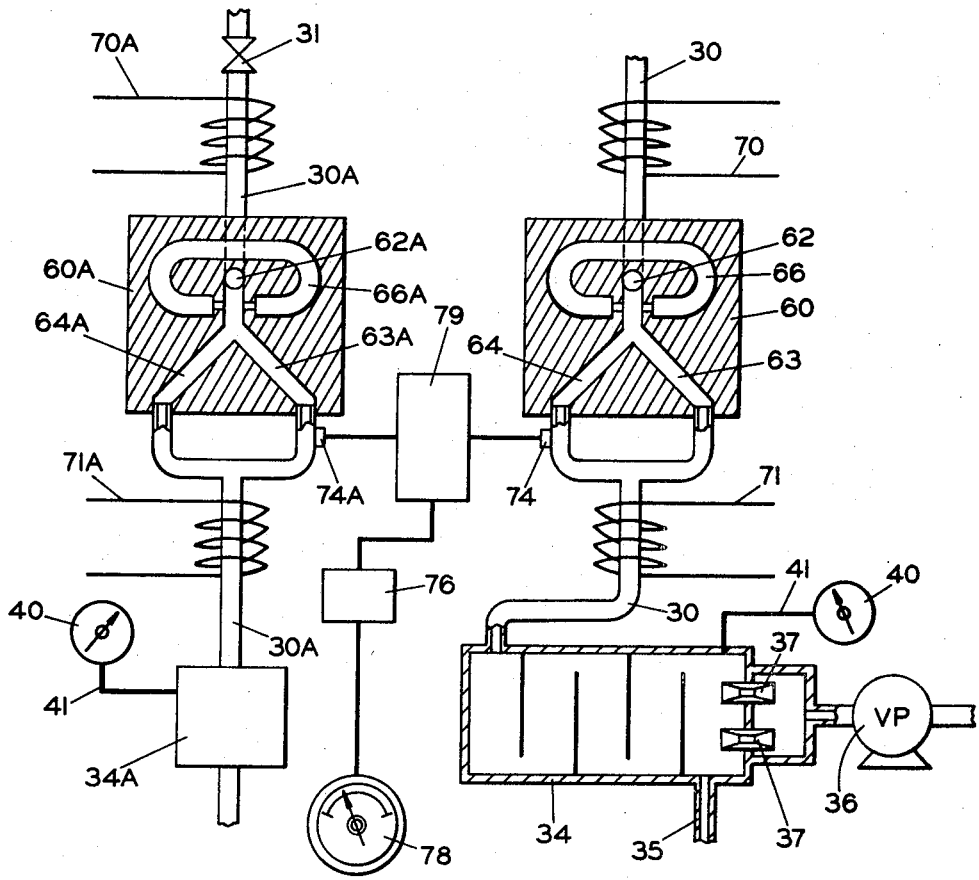
FIG. 3 shows a second embodiment of the invention employing fluidic elements.

Carburetor 22 is attached to a suction pipe 30 which passes through sensing station 32 and a gas liquid separator 34 which in turn is connected to a source of vacuum 36 (see FIG. 3). Gas liquid separator 34 is provided with one or more sonic nozzles 37 which are described in greater detail in the aforementioned Converse, et al. U.S. Pat. No. 3,517,552. Sonic nozzles such as those shown at 37 have the property such that only one pressure sensing point is required in order to measure air volume flowing through the nozzle. So long as the pressure drop across the nozzle exceeds a predetermined amount, the upstream pressure is directly related to the air volume flowing through the nozzle. Thus, there is shown in FIG. 3 a pressure gauge 40 connected by way of pipe 41 to the gas liquid separator 34. Since the gauge reading is a direct function of air volume flowing through nozzles 37, the gauge 40 can be calibrated directly in air volume or weight units.

Returning to FIG. 1, sensor 32 is connected by way of electrical conduits 42 with an electronic device 44 which converts the sensed information to fuel volume of weight measurements. The fuel volume or weight measurement is displayed on a dial 46. Once the air volume or weight flow is known by way of meter 40 and the fuel volume or weight flow is known by way of meter 46, the air/fuel ratio of the mixture flowing through the carburetor can be determined mathematically or as is more common, these signals are fed into a converter unit where the output of the converter is displayed in units of air/fuel ratio.

To compensate for the possibility that the percentage tracer contained in the fuel mixture flowing in pipe 18 may vary, monitor 24 is provided with an error signal output illustrated by dash line 48 which feeds an error signal to the electronics 44 to correct, where necessary, the fuel flow output registered on meter 46.

Figure 2:
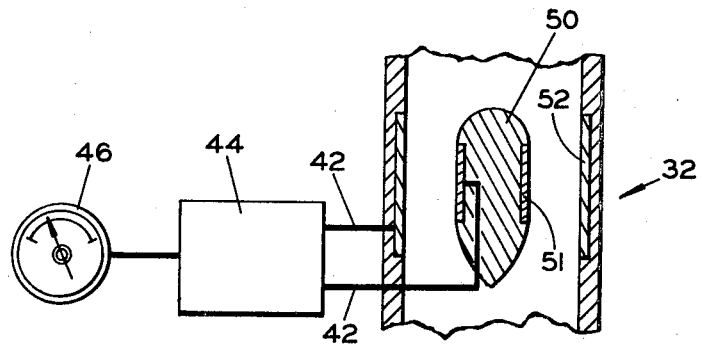
FIG. 2 is a detail of a sensor useful in the embodiment of FIG. 1.

Referring now to FIG. 2, a sensing unit is shown in the form of a capacitance probe. The capacitance probe constitutes a central torpedo 50 upon which is mounted one electrode 51 of a capacitance. The other electrode 52 is mounted in the interior wall of pipe 30. The plates 51 and 52 of the capacitance are taken by way of electrical leads 42 into the electronics portion 44 of the circuit. There the capacitance 51–52 becomes one leg of a Wheatstone bridge. As is customary, the output to meter 46 is taken off opposing corners of the Wheatstone bridge and the output is indicative of change in dielectric constant of the fluidstream flowing between the plates of the capacitance 51–52. If metallic particles are used as the tracer in the fuel, then as each particle passes by the plates 51–52 of the capacitance, the dielectric constant of the total circuit is changed sufficiently to cause a deflection of meter 46.

Since it is contemplated that a high number of metallic particles will flow through the capacitance per unit time, it is desirable to change the electronics from the simple Wheatstone bridge just described to a somewhat more sophisticated counting circuit. Such a counting circuit is shown and described in United States Patent to Spencer, No. 3,231,815 dated Jan. 5, 1966. It will be seen from a reference to the Spencer Patent that an oscillator is employed to generate a reference signal.

This reference signal has a normally fixed frequency, but the presence of a metallic particle between plates 51–52 of the capacitor causes a change in the resonant frequency of an LC circuit of which capacitor 51–52 forms a part. This change in the resonant frequency causes a shift in the oscillator frequency and a resultant change in voltage at a sensing point or detection point on the envelope of the curve of the oscillations. This change in voltage is picked up, amplified and converted to pulses which in turn are passed to a counter and/or an averaging circuit to read out the number of particles passing through the capacitance per unit of time.

In the operation of the embodiment just described, preliminary preparations will be made to fill tank 10 with a suitable fuel and to disperse within the fuel by way of mixer 14 a predetermined quantity of tracer. The quantity of tracer contained within the fuel can be sensed in the recirculation pipe 18 by way of the sensors 26 and monitor 24 so that it can be ascertained that the percentage tracer leaving tank is the same as the tracer returning to the tank. Once equilibrium has been established then a carburetor 22 can be attached to one of the fuelpipes 20 and the vacuum pump 36 started up, so that air is drawn through the carburetor. Once air begins to flow through the carburetor then fuel is also caused to flow in the customary manner.

If it is assumed that there is a constant percentage of tracer or quantity of tracer in the fuel, then a condition can be established so that measurement of the tracer will be representative of the quantity of fuel flowing. For example, if 100 particles of tracer are suspended in one unit volume of fuel, then if a measurement of the tracer material is conducted over a period of time such that 100 particles are measured or counted, then one unit volume of fuel will have been measured. As the mixture passes from sensor 32 to gas liquid separator 34, the liquid is separated out and withdrawn by way of pipe 35 (FIG. 2) and the substantially dry air volume will then be measured by way of meter 40 as previously described. Once an airflow rate has been established and a unit volume of fuel has been measured, then the air/fuel ratio can be mathematically determined or as has been previously suggested, the output of meter 40 and electronic device 44 can be merged into a combined signal representative of air/fuel ratio by way of connections 41A, 46A, converter 47 and air/fuel ratio meter 49

While the foregoing description explains the method of operation of the embodiment of FIGS. 1 and 2, it is to be understood that the foregoing explanation illustrates only one condition of flow. In practice, it is common to flow a carburetor at several different conditions of flow when it is being tested after manufacture. One such flow measurement is at low volumes representative of the idling condition of the engine, a second checkpoint or test can be made at a slightly greater opening of the throttle which is frequently referred to as off-idle position. Still a third testpoint might be represenative of normal highway cruising conditions and this is frequently referred to as part-throttle operation or the part-throttle testpoint. Since a somewhat richer air/fuel ratio is required when the engine is under heavy load, it is also desirable to simulate the heavy load condition and this is done by opening the throttle to its wide open position or wide open throttle testpoint. It is, of course, possible to make as many additional flow measurements as may be required.

Turning now to FIG. 3, there is shown an embodiment of the invention employing fluidic elements. While they are not shown, it will be understood that there will be a fuel supply tank, a fuel supply pump, a fuel distribution piping network and a carburetor similar to those shown in FIG. 1. Wherever possible, the same numerals have been used as were used in FIG. 1. Thus, pipe 30 is the one coming from the carburetor to the sensing device and through the sensing device on down to the liquid vapor separator 34. Again, air flow control is provided by pipe 41 and displayed on meter 40.

The sensor used in the FIG. 3 embodiment is a fluidic device. Fluidic devices as such are well known in the art and need no detailed description here. One form of fluidic device is an oscillator and such oscillators can be varied in frequency as a function of some property of the fluidstream passing through it. If all parameters are held constant excepting one variable, then the frequency of oscillation of the oscillator will be dependent upon that variable. One such variable that is utilized is temperature. Thus, the frequency of oscillation of the oscillator will vary as a function of change of temperature. In the present embodiment it is intended that the temperature be held constant and that the pressure drop across the oscillator be held constant so that a principal remaining variable that can exist in the oscillator is the specific gravity or absolute density of the fluidstream passing through the oscillator. Thus, the frequency of oscillation will vary with any changes that may occur in the specific gravity or absolute density of the fluidstream.

In FIG. 3 such an oscillator is indicated generally at 60. Fluids from the carburetor are passed down pipe 30 to a nozzle 62 which directs the fluids to one or the other of legs 63, 64 of the oscillator. When the fluids are passing down one of the legs of the oscillator, an increase in pressure is sensed by one or another of the ports communicating a loop 66 with the fluidstream flowing from nozzle 62. This creates a pressure wave which traverses the loop and causes the fluidstream to switch to the other one of the two legs. A second wave then traverses the loop and causes the pressure wave to switch the fluidstream to the original leg and this switching back and forth continues at a frequency dependent upon the aforementioned variables.

In order to assure that an homogenous mixture of fuel and air are present in pipe 30, there is provided a heating coil 70 which heats the mixture to a constant temperature sufficient to vaporize all of the fuel. When the vaporized mixture is returned to the lower portion of pipe 30, a cooling coil 71 then cools the mixture sufficient to return the fuel to the liquid condition so that it can be separated from the air in vapor liquid separator 34. In order to determine the frequency of oscillation of the oscillator 60, there is placed against one of the outlet legs a detector 74 which, for all practical purposes, is a simple microphone. The output of microphone 74 is then passed to an amplifier-detector 76 which amplifies the signal and converts it to a direct current voltage so that the output can be read on meter 78. As will be described later, the output from microphone 74 can be first passed to a mixer 79 and thence into the amplifier-detector 76.

Turning now to the lefthand portion of FIG. 3, there is shown an amplifier 60A being fed by a pipe 30A having a valve 31, a heater 70A, a cooling coil 71A for cooling the fluids emerging through pipe 30A and these fluids are then passed to a chamber 34A containing nozzles similar to those shown at 37 in the righthand portion of the Figure. Oscillator 60A is provided with a nozzle 62A similar to that of the righthand portion of the Figure, legs 63A and 64A as well as control loop 66A. One leg of the oscillator is provided with a microphone pick-up 74A. The portion of the system just described serves as a reference and caliberation portion to set the righthand portion to the required value so that the readings at meter 78 will be the desired readings.

The system of FIG. 3 employing the fluidic sensors can be operated in a variety of ways. The first of these methods of operation would involve opening valve 31 so that the vacuum pump will draw a predetermined quantity of air through the pipe 30A and this predetermined quantity of air could be one equivalent to that normally found as flowing through a carburetor at curb-idle conditions. With a constant quantity of air flowing through the pipe 30A, then heater 70A and chilling coil 71A can be used to establish constant temperature conditions within the system at which time sensor 60A will oscillate at a frequency determined by that quantity of dry air flowing through it. These oscillations are picked up by microphone 74A and passed through the mixer to amplifier-detector 76 and thence to readout meter 78 at which a reference voltage will be established representing the quantity of air flowing under the given conditions. Once the reference quantity of air has been established, it is then possible to switch off sensor 66A and transfer to sensor 66 having a carburetor mounted on the upper side of pipe 30. Again, heater 70 will be turned on as well as cooling coil 71 so that identical temperature conditions can be achieved which are the same as those used in the calibration step with sensor 66A. At this point, oscillator 66 will operate at a frequency different from that of oscillator 66A and this difference can then be amplified and rectified in circuit 76 to give a signal on meter 78 representing the change in conditions.

Still another mode of operation involves use of both sensors, 66 and 66A, so that the microphone 74 and 74A both feed signals into mixer 79. In mixer 79 the two signals are combined to produce a beat signal or difference frequency signal which is then passed to detector-amplifier 76 for creating a signal which is sent to meter 78 and this latter signal is one representative of the absolute density of specific gravity of the vaporized fluid mixture passing through sensor 66. Since the absolute density or specific gravity of the mixture is a function of the air/fuel ratio, meter 78 can be calibrated to read in units of air/fuel ratio.

Still a third possible arrangement for use of FIG. 3 is to use sensor 60 only and to mount a carburetor on pipe 30 as before. With no fuel in the carburetor, then the carburetor can be adjusted to give the desired air flow measurement for calibrating meter 78 following which the fuel can be admitted to the carburetor and the sensor 60 will function as heretofore described.

While a fluidic element, an oscillator, has been shown as a sensing device to measure the absolute density of the vaporized air/fuel mixture, it will be apparent to those skilled in the art that other devices could be used. For example, a crystal could be energized to vibrate at a fixed frequency and the time of propagation of the ensuing sound wave across a gap of fixed dimension could be measured. The propagation time would also be a measure of density.

From the foregoing, it is apparent that no actual fuel flow measurement is being made, instead a property of the air/fuel mixture is being detected or sensed and this property is then converted into meaningful units of fuel measurement and/or air/fuel measurement. Accordingly, in the appended claims it is intended that mention of the property of the fluid is to be broadly construed to encompass both embodiments and reasonable variations thereof.

Numerous advantages, not heretofore available, are now possible with the flow test system of the invention. Since earlier systems contemplated measurement of fuel before it entered the fuel bowl, fluctuations of fuel level within the fuel bowl necessarily effected the fuel metering function and this created a hunting condition which was undesirable at best. Because the measurement of the fuel is now taken below the throttle valve, the fuel bowl becomes of less importance and minor fluctuations within the fuel bowl will not adversely effect the fuel measurement. Thus, it is possible to take air/fuel measurements much more quickly as well as more accurately than has heretofore been possible. In the embodiment shown, it can be assumed that the carburetor is a single-barrel carburetor delivering into a single pipe or in the alternative that it is a multi-barrel carburetor delivering all air and fuel into a single pipe. An obvious variation of the system as described would be to isolate the barrels of a multi-barrel carburetor and to place a sensor in the individual pipes leading from the individual barrels. In practice, this would involve delivery pipes for each side of a two-barrel carburetor and the same arrangement could be used for each side of a four-barrel carburetor without difficulty. It has heretofore been impracticable, except as a laboratory exercise, to compare the air/fuel mixture from the separate sides of a multi-barrel carburetor. However, utilizing the invention it is possible by having two sensors to compare the air/fuel ratio from each side of a two-barrel or four-barrel carburetor. This is an important advantage not heretofore available.

I claim:

1. A method of flowing a carburetor and determining the air/fuel ratio of the mixture flowing from the carburetor comprising the steps of:
   A. Installing said carburetor on a riser having a source of vacuum attached thereto and using said vacuum source to draw air through said carburetor,
   B. supplying fuel to said carburetor from a fuel source,
   C. measuring air flow through said carburetor in an air measurement zone between said carburetor and said source of vacuum,
   D. in a sensing zone in said riser and below said carburetor, measuring a property of said fuel, said property being representative of fuel quantity, and
   E. converting said air flow and said fuel quantity to an air/fuel ratio.

2. The method of claim 1, including the step of adding a tracer to said fuel, and in which the said property being measured is the quantity of said tracer in said fuel.

3. The method of claim 2 further including the step of monitoring in a monitoring zone the concentration of tracer in the said fuel as said fuel is supplied from said fuel source.

4. The method of claim 3 further including the steps of creating an error signal and of passing said error signal from said monitor to said measuring whereby to correct for possible change in concentration of said tracer.

5. The method of claim 1 further including the step of vaporizing the said fuel to create a vapor mixture of fuel and air and in which the said property sensed is a physical property of said vaporized mixture.

6. The method of claim 5 in which the said physical property is the absolute density of said mixture.

7. The method of claim 2 further including the steps of monitoring the amount of tracer in said fuel, passing an error signal to the step of measuring the said property of said fuel and correcting for any change in the quantity of tracer in said fuel.

8. The method of claim 6 in which the said vaporized mixture is passed to a fluidic oscillator and in which the sensing is the measurement of the frequency of oscillation of said oscillator.

9. The method of claim 8 further including the step of passing a reference quantity of air through a reference fluidic oscillator and measuring the frequency of oscillation of said reference oscillator and comparing the last-mentioned frequency of oscillation with the frequency obtained in claim 8.

10. The method of claim 9 further including detecting the frequency of said fluidic oscillator and the frequency of oscillation of said reference fluidic oscillator and combing said frequency in an amplifier zone to produce a beat frequency oscillation representative of said air/fuel ratio.

11. In an apparatus for flowing a carburetor to determine the air/fuel ratio of the mixture flowing from said carburetor, a source of fuel for supplying fuel to said carburetor, a source of vacuum for drawing air and fuel through said carburetor, supply means for supplying fuel from said source of fuel to said carburetor, a conduit connecting said source of vacuum to said carburetor and sensing means in said conduit for sensing a property representative of the air/fuel ratio of said mixture.

12. Apparatus according to claim 11 in which said sensing means is operative to determine the air/fuel ratio of said carburetor from said property, 13. Apparatus according to claim 12 in which said sensing means is operative to determine the absolute density of said air/fuel mixture, 14. Apparatus according to claim 13 in which said sensing means comprises a fluidic oscillator, said oscillator having a frequency of oscillation which is a function of said density, 15. Apparatus according to claim 11 in which said sensing means includes absolute pressure measuring means for determining air flow quantity and fuel property sensing means for determining fuel flow quantity.

16. Apparatus according to claim 13 in which said fuel property sensing means comprises electronic detection means for measuring the quantity of tracer in said fuel, said quantity of tracer being representative of said fuel flow quantity, 17. Apparatus according to claim 16 in which said electronic means further includes conversion means for converting the quantity of said tracer sensed and the quantity of air flow determined to an air/fuel ratio, 18. Apparatus according to claim 17 in which said electronic means include a capacitance element in said conduit, said capacitance element being operative to sense the amount of tracer present.

19. A method of flowing a carburetor and determining the air/fuel ratio of the mixture flowing from said carburetor comprising the steps of:

A. Installing said carburetor on a riser having a source of vacuum attached thereto, connecting a source of fuel to said carburetor and using said vacuum to draw a mixture of air and fuel from said carburetor into said riser; and B. in a sensing zone in said riser measuring a property of said air/fuel mixture said property being representative of the air/fuel ratio of said mixture and converting said measuring into an air/fuel ratio.

20. A method according to claim 19 including the further step of separately measuring the quantity of air flowing through said carburetor.

* * * * *